United States Patent
Hilker et al.

(10) Patent No.: US 9,593,756 B2
(45) Date of Patent: Mar. 14, 2017

(54) BEARING ASSEMBLY CONFIGURED TO HANDLE AXIAL AND RADIAL LOADS

(71) Applicant: American Axle & Manufacturing, Inc., Detroit, MI (US)

(72) Inventors: Gregory J. Hilker, Canton, OH (US); William G. Hunt, Tecumseh, MI (US); Gregory E. Woodside, Rochester Hills, MI (US); Douglas J. Chemelli, Royal Oak, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 110 days.

(21) Appl. No.: 13/955,061

(22) Filed: Jul. 31, 2013

(65) Prior Publication Data

US 2015/0038279 A1    Feb. 5, 2015

(51) Int. Cl.
| | |
|---|---|
| *F16C 19/49* | (2006.01) |
| *F16C 19/38* | (2006.01) |
| *F16C 19/54* | (2006.01) |
| *F16H 48/38* | (2012.01) |
| *F16H 48/40* | (2012.01) |

(Continued)

(52) U.S. Cl.
CPC ............. *F16H 48/38* (2013.01); *F16C 19/50* (2013.01); *F16C 19/55* (2013.01); *F16H 48/40* (2013.01); *F16H 2048/423* (2013.01)

(58) Field of Classification Search
CPC .... F16C 2361/61; F16C 19/49; F16H 57/021; B64C 11/06
See application file for complete search history.

(56) References Cited

U.S. PATENT DOCUMENTS

| | | | |
|---|---|---|---|
| 958,963 | A | 5/1910 | Lockwood |
| 980,426 | A | 1/1911 | Lockwood |

(Continued)

FOREIGN PATENT DOCUMENTS

| | | |
|---|---|---|
| CH | 300378 A | 7/1954 |
| DE | 102008049041 A1 | 4/2010 |

(Continued)

OTHER PUBLICATIONS

Office Action dated Aug. 25, 2016 for corresponding German application No. 112014003547.5.

*Primary Examiner* — Tisha Lewis
(74) *Attorney, Agent, or Firm* — Harness, Dickey & Pierce, P.L.C.

(57) ABSTRACT

A bearing assembly and a related power transmitting component. The bearing assembly includes a first bearing, which is an angular contact bearing, and a second bearing, which is a tapered roller bearing. The first bearing has a first inner bearing race, a first outer bearing race and a plurality of spherical bearing balls disposed between the first inner bearing race and the first outer bearing race. The second bearing assembly has a second inner bearing race, a second outer bearing race and a plurality of tapered bearing rolls disposed between the second inner bearing race and the second outer bearing race. One of the first inner and first outer bearing races is fixedly coupled to one of the second inner and second outer bearing races for axial and rotational movement therewith. The first and second bearings are configured to handle thrust in a common axial direction.

28 Claims, 4 Drawing Sheets

(51) Int. Cl.
*F16C 19/50* (2006.01)
*F16C 19/55* (2006.01)
*F16H 48/42* (2012.01)

(56) References Cited

U.S. PATENT DOCUMENTS

| | | | | |
|---|---|---|---|---|
| 2,118,767 | A * | 5/1938 | Proffitt | F16C 19/364 |
| | | | | 384/454 |
| 2,438,542 | A * | 3/1948 | Cushman | 416/147 |
| 2,488,929 | A * | 11/1949 | Palumbo | F16C 19/38 |
| | | | | 384/461 |
| 3,737,202 | A * | 6/1973 | Rosales | F16C 19/55 |
| | | | | 384/461 |
| 4,045,100 | A * | 8/1977 | Beauchet | F16C 19/38 |
| | | | | 384/461 |
| 4,248,487 | A | 2/1981 | Asberg | |
| 4,346,948 | A * | 8/1982 | Kristiansen | F04D 29/36 |
| | | | | 384/611 |
| 4,615,627 | A * | 10/1986 | Schilling et al. | 384/551 |
| 4,834,560 | A | 5/1989 | Jacob et al. | |
| 4,921,403 | A * | 5/1990 | Poucher et al. | 416/147 |
| 5,382,099 | A * | 1/1995 | Bauer et al. | 384/454 |
| 5,435,651 | A | 7/1995 | Everman | |
| 5,492,419 | A * | 2/1996 | Miller et al. | 384/551 |
| 5,639,166 | A | 6/1997 | Dittenhofer | |
| 6,679,634 | B2 * | 1/2004 | Plesh, Sr. | 384/510 |
| 7,287,911 | B2 | 10/2007 | Dodoro et al. | |
| 7,427,163 | B2 | 9/2008 | Schoder et al. | |
| 7,537,390 | B2 * | 5/2009 | De Boer et al. | 384/504 |
| 7,572,061 | B2 * | 8/2009 | Fox et al. | 384/494 |
| 8,057,184 | B2 * | 11/2011 | Sebald | 416/174 |
| 8,764,305 | B2 * | 7/2014 | Henneberger | 384/551 |
| 2011/0007992 | A1 * | 1/2011 | Wolf | 384/494 |
| 2012/0141058 | A1 | 6/2012 | Radinger et al. | |

FOREIGN PATENT DOCUMENTS

| | | |
|---|---|---|
| DE | 10201100370 A1 | 8/2012 |
| EP | 1745221 B1 | 10/2008 |
| EP | 2508767 A1 | 10/2012 |
| FR | 551761 A | 4/1923 |
| JP | 2004019772 A | 1/2004 |
| RU | 2346190 C2 | 2/2009 |
| SU | 941726 A1 | 7/1982 |

* cited by examiner

BEARING ASSEMBLY CONFIGURED TO HANDLE AXIAL AND RADIAL LOADS

FIELD

The present disclosure relates to a bearing assembly that is configured to handle axial and radial loads.

BACKGROUND

This section provides background information related to the present disclosure which is not necessarily prior art.

Various bearing configurations are known in the art for supporting a rotating element, such as a shaft, in situations where the shaft is subjected to radial and axial loads. In the field of power transmitting components, it is relatively common to employ tapered roller bearings to support a shaft in an axle assembly, a transfer case or a power take-off unit. While tapered roller bearings are well suited to handle relatively high axial loads, they are typically characterized with a relatively high rotational drag that is inherent in their design. Accordingly, there is a need in the art for an improved bearing assembly that is configured to handle axial and radial loads.

SUMMARY

This section provides a general summary of the disclosure, and is not a comprehensive disclosure of its full scope or all of its features.

In one form, the present teachings provide a bearing assembly that is configured to handle axial and radial loads. The bearing assembly includes a first bearing, which is an angular contact bearing, and a second bearing, which is a tapered roller bearing. The first bearing has a first inner bearing race, a first outer bearing race and a plurality of spherical bearing balls disposed between the first inner bearing race and the first outer bearing race. The second bearing assembly has a second inner bearing race, a second outer bearing race and a plurality of tapered bearing rolls disposed between the second inner bearing race and the second outer bearing race. One of the first inner and first outer bearing races is fixedly coupled to one of the second inner and second outer bearing races for axial and rotational movement therewith. The first and second bearings are configured to handle thrust in a common axial direction.

In another form, the present teachings provide a power transmitting component that includes a housing, a ring gear rotatably mounted in the housing, a pinion shaft, a pinion gear meshed with the ring gear, and a bearing assembly. The pinion gear is mounted on the pinion shaft for common rotation. The bearing assembly supports the pinion shaft for rotation relative to the housing about a rotational axis. The bearing assembly includes a first bearing, which is an angular contact bearing, and a second bearing, which is a tapered roller bearing. The first bearing has a first inner bearing race, a first outer bearing race and a plurality of spherical bearing balls disposed between the first inner bearing race and the first outer bearing race. The second bearing assembly has a second inner bearing race, a second outer bearing race and a plurality of tapered bearing rolls disposed between the second inner bearing race and the second outer bearing race. One of the first inner and first outer bearing races is fixedly coupled to one of the second inner and second outer bearing races for axial and rotational movement therewith. The first and second bearings are configured to handle thrust in a common axial direction.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
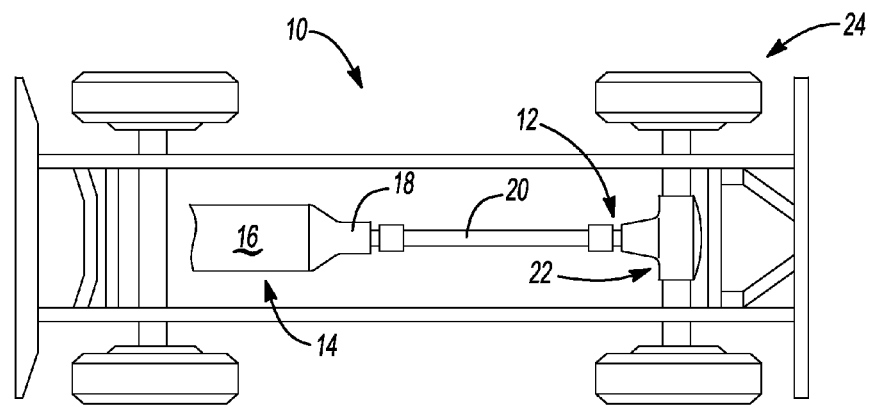
FIG. 1 is a schematic illustration of a vehicle having an exemplary power transmitting component with a bearing assembly constructed in accordance with the teachings of the present disclosure.

With reference to FIG. 1 of the drawings, a vehicle 10 is schematically illustrated to have a driveline 12 that is drivable via a connection to a power train 14 that can have a power transmitting component having a bearing assembly that is constructed in accordance with the teachings of the present disclosure. The power train 14 can include an engine 16 and a transmission 18. The driveline 12 can include a propshaft 20, an axle assembly 22 (i.e., the power transmitting component in the particular example provided) and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the axle assembly 22 where it can be selectively apportion in a predetermined manner to the left and right rear wheels 24a and 24b, respectively.

Figure 2:
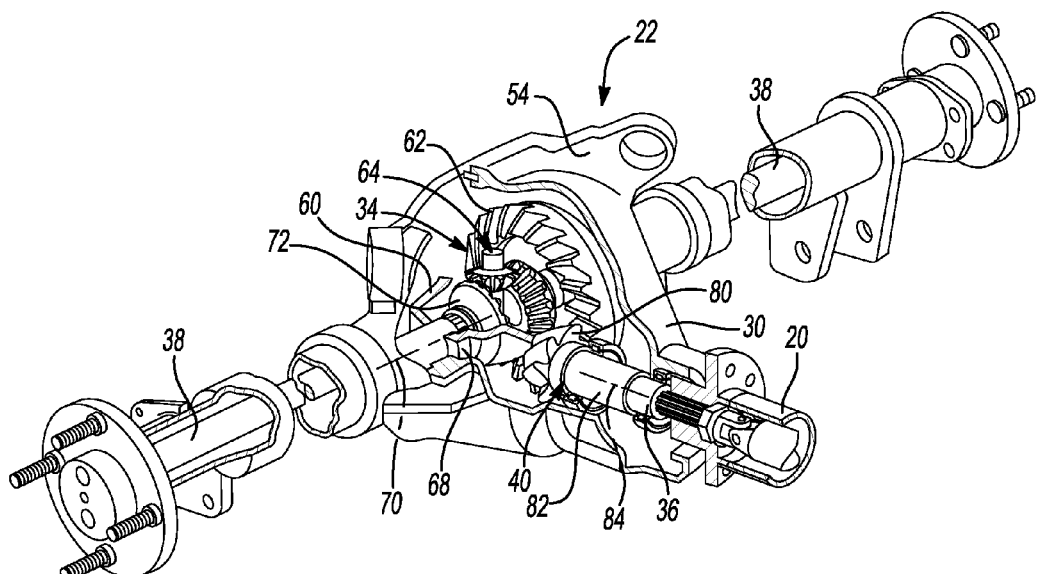
FIG. 2 is a perspective, partially sectioned view of the power transmitting component of FIG. 1.
Figure 5:
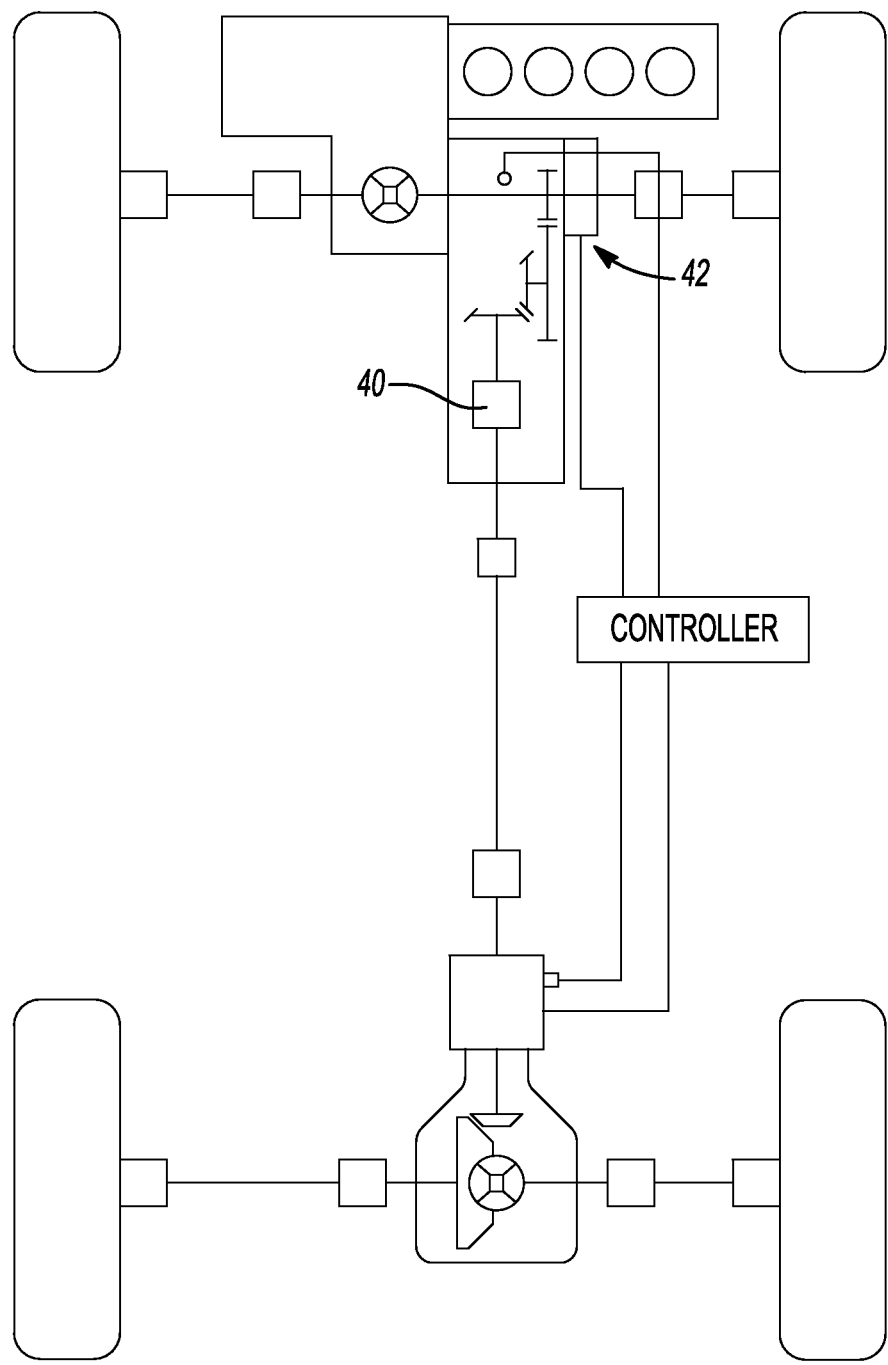
FIG. 5 is a schematic illustration of another exemplary power transmitting component having a bearing assembly constructed in accordance with the teachings of the present disclosure.

With reference to FIG. 2, the axle assembly 22 can include an axle housing assembly 30, a differential assembly 34, an input pinion 36, a pair of axle shafts 38 and the bearing assembly 40. Those of skill in the art will appreciate that the axle assembly 22 is but one type of power transmitting device and that the teachings of the present disclosure have application to other types of power transmitting devices, such as a power take-off unit 42 (FIG. 5).

The axle housing assembly 30 is illustrated to be a Salisbury-type axle housing assembly, but it will be appreciated that the teachings of the present disclosure have application to other types of axle housing assemblies, including independent and banjo axle housing assemblies, and that the axle assemblies could be configured for use as front or rear axle assemblies. The axle housing assembly 30 can include a carrier housing 54.

The differential assembly 34 can comprise any type of differential and can include a differential case 60, a pair of differential bearings (not specifically shown), a ring gear 62 and a power transmitting means 64. The differential case 60 can include a mounting flange (not specifically shown), to which the ring gear 62 can be fixedly coupled, and a pair of hollow trunnions 68. The differential bearings can be mounted between the trunnions 68 and the carrier housing 54 such that the differential case 60 is rotatable about a first axis 70. The power transmitting means 64 can transmit rotary power between the differential case 60 and the axle shafts 38. In the particular example provided, the power transmitting means comprises a differential gearset having a pair of side gears 72 (only one shown), but it will be appreciated that other devices, including clutches, could be employed in the alternative.

The input pinion 36 can comprise a pinion gear 80 and a pinion shaft 82. The pinion gear 80 can be meshlingly engaged to the ring gear 62 and can be fixed to the pinion shaft 82 for common rotation. The pinion shaft 82 can be received in the carrier housing 54. The bearing assembly 40 can be coupled to the input pinion 36 and the carrier housing 54 to support the pinion shaft 82 for rotation about a second axis 84.

Figure 3:
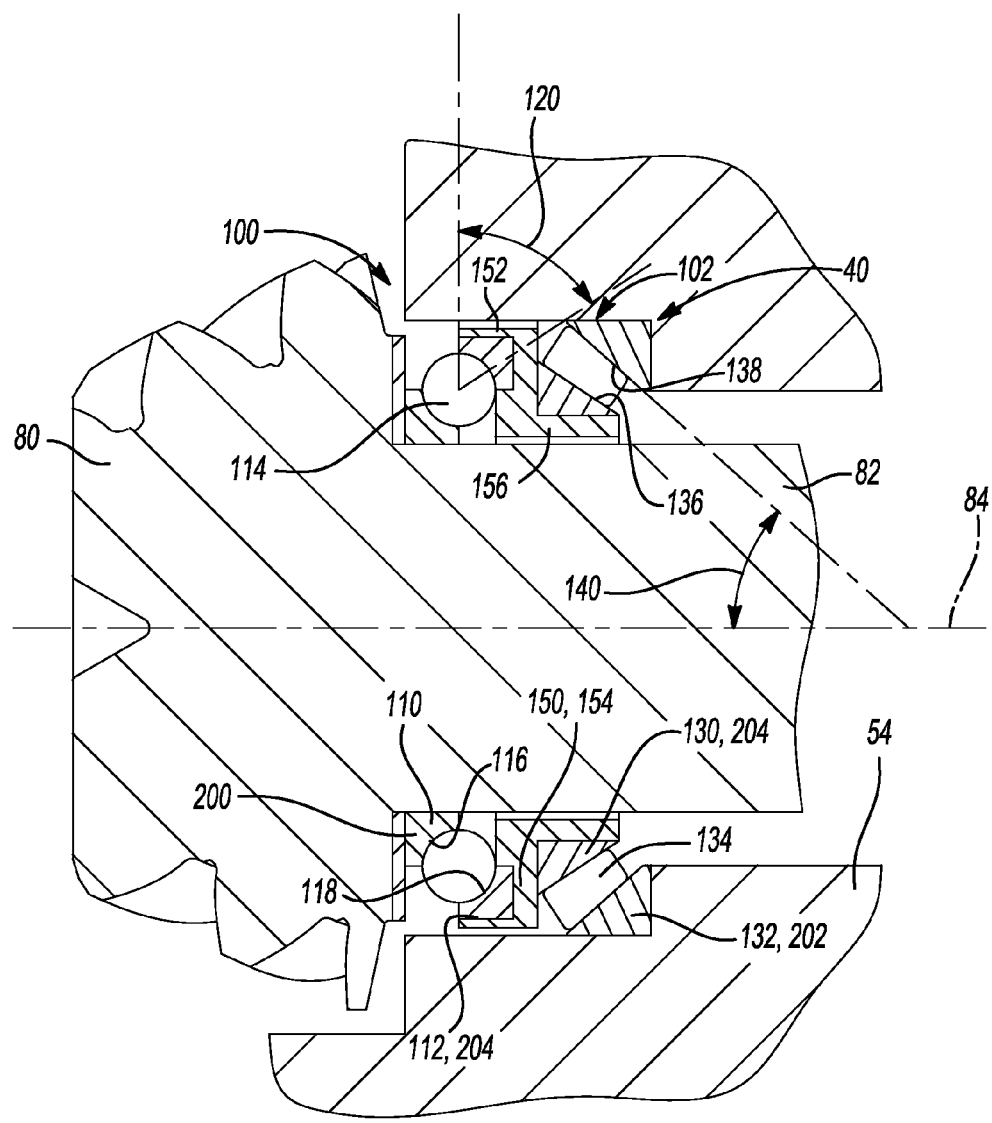
FIG. 3 is a section view of a portion of the power transmitting component taken along the line 3-3 of FIG. 2.

With specific reference to FIG. 3, the bearing assembly 40 that supports the input pinion 36 is depicted in greater detail. The bearing assembly 40 can include a first bearing 100 and a second bearing 102.

The first bearing 100 can be an angular contact bearing and can have a first inner bearing race 110, a first outer bearing race 112, and a plurality of spherical bearing balls 114. The first inner bearing race 110 can define a first inner raceway 116 that can be defined by a spherical radius that is matched to the radius of the spherical bearing balls 114. Similarly, the first outer bearing race 112 can define a first outer raceway 118 that can be defined by a spherical radius that is matched to the radius of the spherical bearing balls 114. The spherical bearing balls 114 can be received between the first inner and outer bearing races 110 and 112 and engaged to the first inner and outer raceways 116 and 118. The first bearing 100 can be configured with a first contact angle 120 that defines a first contact cone. In the particular example provided, the first contact cone is oriented along the second axis 84 so as to diverge with increasing distance away from the first bearing 100 in a direction toward the second bearing 102. Stated another way, the first contact cone can be oriented along the second axis 84 such that a dimension spanning across the first contact cone taken perpendicular to the second axis 84 increases with increasing distance away from the first bearing 100 in a direction toward the second bearing 102.

The second bearing 102 can be a tapered roller bearing and can have a second inner bearing race 130, a second outer bearing race 132 and a plurality of tapered bearing rolls 134. The second inner bearing race 130 can define a second inner raceway 136 that can have a frusto-conical shape. Similarly, the second outer bearing race 132 can define a second outer raceway 138 that can have a frusto-conical shape. The tapered bearing rolls 134 can be received between the second inner and outer bearing races 130 and 132 and can be engaged to the second inner and outer raceways 136 and 138. The second bearing 102 can be configured with a second contact angle 140 that defines a second contact cone.

In the particular example provided, the second contact cone is oriented along the second axis 84 so as to diverge with increasing distance away from the second bearing 102 in a direction toward the first bearing 100. Stated another way, the second contact cone can be oriented along the second axis 84 such that a dimension spanning across the second contact cone taken perpendicular to the second axis 84 increases with increasing distance away from the second bearing 102 in a direction toward the first bearing 100.

One of the first inner bearing race 110 and the first outer bearing race 112 can be fixedly coupled to one of the second inner bearing race 130 and the second outer bearing race 132 for both axial and rotational movement therewith (i.e., combined axial movement along the second axis 84 and combined rotational movement about the second axis 84). The first and second bearings 100 and 102 are configured to handle thrust in a common axial direction (i.e., along the second axis 84 in a common direction), and as such, the first and second bearings 100 and 102 are disposed in series. Consequently, either the first outer bearing race 112 is fixedly coupled to the second inner bearing race 130, as is the case in the present example, or the second outer bearing race 132 is fixedly coupled to the first inner bearing race 110.

The coupling of the bearing races to one another in a fixed manner can be executed in any desired manner. For example, a connector sleeve 150 can be employed as a mount for the bearing races (e.g., the first outer bearing race 112 and the second inner bearing race 130 in the example provided). The connector sleeve 150 can have a partial cross-section that can be generally Z-shaped (or generally S-shaped, depending on the particular configuration and orientation of the first and second bearings 100 and 102) with a first connector portion 152, a connecting wall 154, and a second connector portion 156. The first connector portion 152 is tubular in construction and is configured to receive an associated portion of the first bearing 100 (e.g., the first outer bearing race 112 in the example provided). The second connector portion 156 is tubular in construction and is configured to receive an associated portion of the second bearing 102 (e.g., the second inner bearing race 130 in the example provided). The connecting wall 154 can have an annular configuration and can join or fixedly couple the first and second connector portions 152 and 156. The bearing races can be coupled to the connector sleeve 150 in any desired manner, such as via press-fit engagement to the first and/or second connector portions 152 and 156, crimping, rolling, staking, welding (e.g., laser welding) and/or an adhesive material. Coupling of the bearing races via a connector sleeve 150 may be advantageous in situations where it is desirable to employ discrete bearing races.

Figure 4:
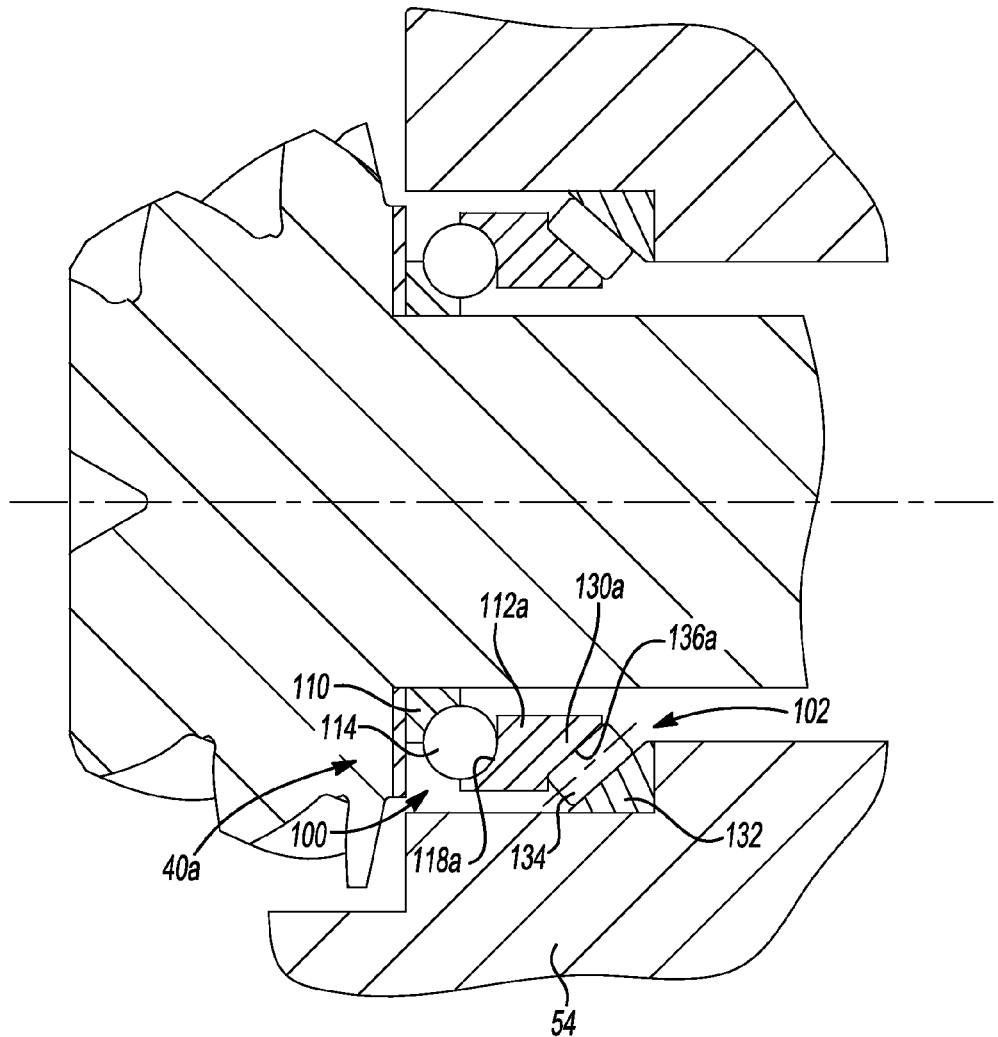
FIG. 4 is a view similar to that of FIG. 3 but depicting an alternately constructed bearing assembly.

As an alternative, the configuration of FIG. 4 employs bearing races that are integrally and unitarily formed from a single piece of metal. More specifically, the first outer bearing race 112*a* and the second inner bearing race 130*a* are formed of a single piece of metal in which the first outer raceway 118*a* and the second inner raceway 136*a* are formed on opposite sides. Configuration in this manner may render the bearing assembly 40*a* somewhat more compact as compared to the previous example.

With reference to FIGS. 2 and 3, when rotary power is transmitted through the propshaft 20 to drive the input pinion 36, relative rotation of bearing balls 114 and the tapered bearing rolls 134 relative to the bearing races that are axially and rotationally fixed to one another will be effected by the rotational speed of the input pinion 36 and torque that is transmitted between the input pinion 36 and the ring gear 62. For example, in situations where relatively high torque is transmitted through the input pinion 36 at relatively low rotational speeds, the second bearing 102 (i.e., the tapered roller bearing portion of the bearing assembly 40) may transmit load more efficiently and as such, the tapered bearing rolls 134 may rotate relative to the second inner bearing race 130, while the bearing balls 114 may remain stationary relative to the first outer bearing race 112. As another example, in situations where relatively low torque is transmitted through the input pinion 36 at relative high rotational speeds, the first bearing 100 (i.e., the angular contact ball bearing portion of the bearing assembly 40) may transmit load more efficiently and as such, the bearing balls 114 may rotate relative to the first outer bearing race 112, while the tapered bearing rolls 134 may remain stationary relative to the second inner bearing race 130. It will be appreciated that in some situations relative rotation could occur between the bearing balls 114 and the first outer bearing race 112 and between the tapered rollers—and the second inner bearing race 130.

In view of the above discussion, the bearing assembly 40 can be thought of as having a first or inner race 200, a second or outer race 202, at least two floating races 204 disposed between the first and second races 200 and 202, a plurality of bearing balls 114 between a first adjacent pair of races (e.g., between the first race 200 and a first one of the floating races 204), and a plurality of tapered bearing rolls 134 between a second adjacent pair of the races (e.g., between a second one of the floating races 204 and the second race 202). The bearing races that are axially and rotationally coupled to one another can be considered to be a "floating portion" of the bearing assembly 40 as they would not be axially fixed to either the carrier housing 54 or the input pinion 36. As is apparent from the above discussion, the first race 200 is the first inner bearing race 110, the second race 202 is the second outer bearing race 132 and the floating races 204 are the first outer bearing race 112 and the second inner bearing race 130 in the particular example provided. Alternatively, the bearing assembly 40 could be configured such that the first race 200 is the second inner bearing race 130, the second race 202 is the first outer bearing race 112 and the floating races 204 are the second outer bearing race 132 and the first inner bearing race 110.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing assembly that is configured to handle axial and radial loads, the bearing assembly comprising:
    a first bearing having a first inner bearing race, a first outer bearing race and a plurality of spherical bearing balls disposed between the first inner bearing race and the first outer bearing race, the first bearing being an angular contact bearing; and
    a second bearing assembly having a second inner bearing race, a second outer bearing race and a plurality of tapered bearing rolls disposed between the second inner bearing race and the second outer bearing race;
    wherein one of the first inner and first outer bearing races is fixedly coupled to one of the second inner and second outer bearing races for axial and rotational movement therewith, and wherein the first and second bearings are configured to accommodate axial loading that occurs in a common axial direction to thereby transmit the axial loading between the first inner and first outer bearing races and between the second inner and second outer bearing races; and
    wherein application of an axial load to the bearing assembly in a direction that is opposite the common axial direction tends to urge the first inner and first outer bearing races apart from one another and tends to urge the second inner and second outer bearing races apart from one another.

2. The bearing assembly of claim 1, wherein the one of the first inner and first outer bearing races and the one of the second inner and second outer bearing races are fixedly coupled to a connector sleeve that is disposed between the first and second bearings.

3. The bearing assembly of claim 1, wherein the one of the first inner and first outer bearing races and the one of the second inner and second outer bearing races are integrally and unitarily formed from a single piece of metal.

4. The bearing assembly of claim 1, wherein the one of the first inner and first outer bearing races is the first outer bearing race and the one of the second inner and second outer bearing races is the second inner bearing race.

5. The bearing assembly of claim 1, wherein the first bearing has a predetermined first contact angle, wherein the first contact angle defines a first contact cone, and wherein a dimension spanning across the first contact cone taken perpendicular to a rotational axis defined by the bearing assembly increases with increasing distance away from the first bearing in a direction toward the second bearing.

6. The bearing assembly of claim 5, wherein the second bearing has a predetermined second contact angle, wherein the second contact angle defines a second contact cone, and wherein a dimension spanning across the second contact cone taken perpendicular to the rotational axis increases with increasing distance away from the second bearing in a direction toward the first bearing.

7. A power transmitting device comprising:
    a housing;
    a ring gear rotatably mounted in the housing;
    a pinion shaft;
    a pinion gear meshed with the ring gear, the pinion gear being mounted on the pinion shaft for common rotation; and
    a bearing assembly that supports the pinion shaft for rotation relative to the housing about a rotational axis, the bearing assembly comprising:
        a first bearing having a first inner bearing race, a first outer bearing race and a plurality of spherical bearing balls disposed between the first inner bearing race and the first outer bearing race, the first bearing being an angular contact bearing; and
        a second bearing assembly having a second inner bearing race, a second outer bearing race and a plurality of tapered bearing rolls disposed between the second inner bearing race and the second outer bearing race;
    wherein one of the first inner and first outer bearing races is fixedly coupled to one of the second inner and second outer bearing races for axial and rotational movement therewith, and wherein the first and second bearings are configured to accommodate axial loading that occurs in a common axial direction to thereby transmit the axial loading between the first inner and first outer bearing races and between the second inner and second outer bearing races; and wherein application of an axial load to the bearing assembly in a direction that is opposite the common axial direction tends to urge the first inner and first outer bearing races apart from one another and tends to urge the second inner and second outer bearing races apart from one another.

8. The power transmitting device of claim 7, wherein the one of the first inner and first outer bearing races and the one of the second inner and second outer bearing races are fixedly coupled to a connector sleeve that is disposed between the first and second bearings.

9. The power transmitting device of claim 7, wherein the one of the first inner and first outer bearing races and the one of the second inner and second outer bearing races are integrally and unitarily formed from a single piece of metal.

10. The power transmitting device of claim 7, wherein the one of the first inner and first outer bearing races is the first outer bearing race and the one of the second inner and second outer bearing races is the second inner bearing race.

11. The power transmitting device of claim 7, wherein the first bearing has a predetermined first contact angle, wherein the first contact angle defines a first contact cone, and wherein a dimension spanning across the first contact cone taken perpendicular to a rotational axis defined by the bearing assembly increases with increasing distance away from the first bearing in a direction toward the second bearing.

12. The power transmitting device of claim 11, wherein the second bearing has a predetermined second contact angle, wherein the second contact angle defines a second contact cone, and wherein a dimension spanning across the second contact cone taken perpendicular to the rotational axis increases with increasing distance away from the second bearing in a direction toward the first bearing.

13. The power transmitting device of claim 7, wherein the housing is an axle housing and the power transmitting device is an axle assembly.

14. The power transmitting device of claim 7, wherein the power transmitting device is a power take-off unit.

15. The power transmitting device of claim 7, wherein the power transmitting device is a transfer case.

16. A power transmitting device comprising:
a housing;
a ring gear rotatably mounted in the housing;
a pinion shaft;
a pinion gear meshed with the ring gear, the pinion gear being mounted on the pinion shaft for common rotation; and
a bearing assembly that supports the pinion shaft for rotation relative to the housing about a rotational axis, the bearing assembly comprising:
a first bearing having a first inner bearing race, a first outer bearing race and a plurality of spherical bearing balls disposed between the first inner bearing race and the first outer bearing race, the first bearing being an angular contact bearing; and
a second bearing assembly having a second inner bearing race, a second outer bearing race and a plurality of tapered bearing rolls disposed between the second inner bearing race and the second outer bearing race;
wherein the first outer bearing race is fixedly coupled to the second inner bearing race for axial and rotational movement therewith, and wherein the first and second bearings are configured to handle thrust in a common axial direction;

wherein the first bearing has a predetermined first contact angle, wherein the first contact angle defines a first contact cone, and wherein a dimension spanning across the first contact cone taken perpendicular to a rotational axis defined by the bearing assembly increases with increasing distance away from the first bearing in a direction toward the second bearing.

17. The power transmitting device of claim 16, wherein the first outer bearing race and the second inner bearing race are fixedly coupled to a connector sleeve that is disposed between the first and second bearings.

18. The power transmitting device of claim 16, wherein the first outer bearing race and the second inner bearing race are integrally and unitarily formed from a single piece of metal.

19. The power transmitting device of claim 16, wherein the second bearing has a predetermined second contact angle, wherein the second contact angle defines a second contact cone, and wherein a dimension spanning across the second contact cone taken perpendicular to the rotational axis increases with increasing distance away from the second bearing in a direction toward the first bearing.

20. A bearing assembly comprising:
an angular contact ball bearing having a plurality of bearing balls between a first inner bearing race and a first outer bearing race; and
a tapered roller bearing having a plurality of tapered bearing rolls between a second inner bearing race and a second outer bearing race;
wherein the first outer bearing race is coupled for rotation with the second inner bearing race or the first inner bearing race is coupled for rotation with the second outer bearing race; and
wherein the angular contact ball bearing has a predetermined first contact angle, wherein the first contact angle defines a first contact cone, and wherein a dimension spanning across the first contact cone taken perpendicular to a rotational axis defined by the bearing assembly increases with increasing distance away from the angular contact ball bearing in a direction toward the tapered roller bearing.

21. The bearing assembly of claim 20, wherein the tapered roller bearing has a predetermined second contact angle, wherein the second contact angle defines a second contact cone, and wherein a dimension spanning across the second contact cone taken perpendicular to the rotational axis increases with increasing distance away from the tapered roller bearing in a direction toward the angular contact ball bearing.

22. A power transmitting device comprising:
a housing;
a ring gear rotatably mounted in the housing;
a pinion shaft;
a pinion gear meshed with the ring gear, the pinion gear being mounted on the pinion shaft for common rotation; and
a bearing assembly that supports the pinion shaft for rotation relative to the housing about a rotational axis, the bearing assembly comprising:
an angular contact ball bearing having a plurality of bearing balls between a first inner bearing race and a first outer bearing race; and a tapered roller bearing having a plurality of tapered bearing rolls between a second inner bearing race and a second outer bearing race;

wherein the first outer bearing race is coupled for rotation with the second inner bearing race or the first inner bearing race is coupled for rotation with the second outer bearing race.

23. The power transmitting device of claim 22, wherein the first outer bearing and the second inner bearing race are fixedly coupled to a connector sleeve that is disposed between the angular contact ball bearing and the tapered roller bearing.

24. The power transmitting device of claim 22, wherein the first inner bearing race and the second outer bearing race are fixedly coupled to a connector sleeve that is disposed between the angular contact ball bearing and the tapered roller bearing.

25. The power transmitting device of claim 22, wherein the first outer bearing and the second inner bearing race are integrally and unitarily formed from a single piece of metal.

26. The power transmitting device of claim 22, wherein the first inner bearing race and the second outer bearing race are integrally and unitarily formed from a single piece of metal.

27. The power transmitting device of claim 22, wherein the angular contact ball bearing has a predetermined first contact angle, wherein the first contact angle defines a first contact cone, and wherein a dimension spanning across the first contact cone taken perpendicular to a rotational axis defined by the bearing assembly increases with increasing distance away from the angular contact ball bearing in a direction toward the tapered roller bearing.

28. The power transmitting device of claim 27, wherein the tapered roller bearing has a predetermined second contact angle, wherein the second contact angle defines a second contact cone, and wherein a dimension spanning across the second contact cone taken perpendicular to the rotational axis increases with increasing distance away from the tapered roller bearing in a direction toward the angular contact ball bearing.

* * * * *